(12) United States Patent
Cheng et al.

(10) Patent No.: US 10,798,589 B2
(45) Date of Patent: Oct. 6, 2020

(54) METHODS AND DEVICES FOR MEASUREMENT REPORTING IN BEAM OPERATIONS

(71) Applicant: FG Innovation Company Limited, Tuen Mun (CN)

(72) Inventors: Yu-Hsin Cheng, Hsinchu (TW); Chie-Ming Chou, Hsinchu (TW); Hung-Chen Chen, Hsinchu (TW); Chien-Chun Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/282,308

(22) Filed: Feb. 22, 2019

(65) Prior Publication Data
US 2019/0261195 A1 Aug. 22, 2019

Related U.S. Application Data

(60) Provisional application No. 62/633,751, filed on Feb. 22, 2018.

(51) Int. Cl.
*H04W 16/28* (2009.01)
*H04W 24/10* (2009.01)
(Continued)

(52) U.S. Cl.
CPC ............. *H04W 16/28* (2013.01); *H04L 43/16* (2013.01); *H04W 8/22* (2013.01); *H04W 24/08* (2013.01); *H04W 24/10* (2013.01); *H04W 72/042* (2013.01); *H04W 72/046* (2013.01); *H04W 72/0413* (2013.01); *H04W 76/27* (2018.02); *H04W 80/02* (2013.01)

(58) Field of Classification Search
CPC ... H04W 16/28; H04W 72/0413; H04W 8/22; H04W 80/02; H04W 76/27; H04W 24/08; H04W 72/042; H04W 72/046; H04W 24/10; H04W 36/06; H04W 36/0085; H04L 43/16
See application file for complete search history.

(56) References Cited

U.S. PATENT DOCUMENTS

2014/0171086 A1* 6/2014 Nakamori ......... H04W 36/0088
455/436
2016/0337056 A1* 11/2016 Frenne .................. H04B 7/0695
(Continued)

FOREIGN PATENT DOCUMENTS

| CN | 104737461 A | 6/2015 |
|---|---|---|
| WO | 2014054186 A1 | 3/2014 |
| WO | 2016175690 A1 | 11/2016 |

OTHER PUBLICATIONS

Astri et al. Discussion on downlink measurement mechanism for NR inter-cell mobility 3GPP TSG-RAN WG2 Meeting #97 R2-1700777 Feb. 17, 2017(Feb. 17, 2017) part 2.1-2.2.

*Primary Examiner* — Steven H Nguyen
(74) *Attorney, Agent, or Firm* — ScienBiziP, P.C.

(57) ABSTRACT

A method for wireless communications between a User Equipment (UE) and a Base Station (BS) is provided. The method includes counting, by a UE, a number of beam switching within a particular period of time, and transmitting, by the UE, a measurement report to a BS when the number of beam switching exceeds a threshold during the particular period of time.

24 Claims, 19 Drawing Sheets

(51) Int. Cl.
*H04W 72/04* (2009.01)
*H04W 24/08* (2009.01)
*H04W 76/27* (2018.01)
*H04L 12/26* (2006.01)
*H04W 80/02* (2009.01)
*H04W 8/22* (2009.01)

(56) References Cited

U.S. PATENT DOCUMENTS

| | | | |
|---|---|---|---|
| 2018/0007605 A1* | 1/2018 | Eriksson | H04W 72/1268 |
| 2018/0302889 A1* | 10/2018 | Guo | H04L 5/0085 |
| 2018/0323856 A1* | 11/2018 | Xiong | H04B 7/088 |
| 2019/0159076 A1* | 5/2019 | Kim | H04W 68/02 |

\* cited by examiner

```
ReportConfig::={

ReportConfigID:1
    EventTriggerConfig::=SEQUENCE{
        eventId::=CHOICE{ event X::=SEQUENCE{
                    X-Threshold:10(dB)
                    X-MaxCounter:7(times),
                    timeToTrigger:100(ms)
            },
        }
    }
}
```

FIG. 1

```
MeasObject::=SEQUENCE{
                ⋮
    MeasObjectID:1
    ReferenceSignalConfig::=SEQUENCE{
        - CSI RS resource#1
        - CSI RS resource#2
        - CSI RS resource#3
    }
                ⋮
}
```

MeasConfig::=        {
                 ⋮
        MeasIdToAddModLIST::=SEQUENCE{
            MeasIdToAddMod::={
                -MeasId=1
                -MeasObjectId=1
                -ReportConfigId=1
        }
                 ⋮
    }
```

FIG. 3

```
MeasConfig::=        {
         ⋮
   MeasIdToAddModLIST::=SEQUENCE{
         MeasIdToAddMod::={
             —MeasId=2
             —MeasObjectId=2
             —ReportConfigId=3
   }
         ⋮
}
```

FIG. 12

```
MeasObject::=SEQUENCE{
              ⋮
   MeasObjectID:2
   ReferenceSignalConfig::=SEQUENCE{
         — CSI RS resource#1
         — CSI RS resource#2
         — CSI RS resource#3
      }
         ⋮
}
```

FIG. 13

```
ReportConfig::={
    ⋮
    ReportConfigID:3
    EventTriggerConfig::=SEQUENCE{
        eventId::=CHOICE{
            ⋮
            event X::=SEQUENCE{
                timeToTrigger:100(ms)
            },
            ⋮
        }
    }
    ⋮
}
```

FIG. 14

```
Measured result in time slot K:
    - CSI RS resource#1 = -70 dBm
    - CSI RS resource#2 = -90 dBm
    - CSI RS resource#3 = -91 dBm
```

FIG. 15

```
Measured result in time slot K+1:
    - CSI RS resource#1 = -89 dBm
    - CSI RS resource#2 = -59 dBm
    - CSI RS resource#3 = -90 dBm
```

FIG. 16

```
TCIStateConfiguration::={

TCI-State::Sequence{
       TCI-RS-Set::{
           TCI-RS-Set-index:1
           Reference Signal:SSB#1
                  ⋮
       }
              ⋮

TCI-RS-Set::{
           TCI-RS-Set-index:16
           Reference Signal:CSI-RS resource #8
                  ⋮
       }
   }
}
```

| MAC-CE |

| 1 | 1 | 1 | 1 | 0 | 0 | 0 | 0 |
| 1 | 1 | 1 | 1 | 0 | 0 | 0 | 0 |

```
ControlResourceSet::=       {
    ⋮
    tci-StatesPDCCH:TCI-state4
    tci-PresentinDCI:true
    ⋮
}
```

```
Downlink Control Information
    ⋮
    -TCI-State:TCI-State 8
    ⋮
```

FIG. 22

```
TCIStateConfiguration::={

TCI-State::Sequence{
        TCI-RS-Set::{
            TCI-RS-Set-index:1
            Reference Signal:SSB #1
                    ⋮
        }
            ⋮

TCI-RS-Set::{
            TCI-RS-Set-index:16
            Reference Signal:SSB #6
                    ⋮
        }
    }
}
```

FIG. 24

METHODS AND DEVICES FOR MEASUREMENT REPORTING IN BEAM OPERATIONS

CROSS-REFERENCE TO RELATED APPLICATION(S)

The present application claims the benefit of and priority to a provisional U.S. Patent Application Ser. No. 62/633,751 filed on Feb. 22, 2018, entitled "Method and Apparatus for Beam Level Mobility Report for Beam Operation,". The disclosure of the US73311 application is hereby incorporated fully by reference into the present application.

FIELD

The present disclosure generally relates to wireless communications, and more particularly, to methods and devices for measurement reporting in beam operations.

BACKGROUND

Various efforts have been made to improve the performance in wireless communications, such as improving data rate, latency, reliability and mobility, for the next generation (e.g., 5G New Radio (NR)) wireless communication systems. Among these efforts, the next generation wireless communication systems may provide a set of beam operations, by which User Equipments (UEs) and Base Stations (BSs) (e.g., Next Generation Node Bs (gNBs)) may establish one or more directional transmission links to benefit from the resulting beamforming gains and sustain quality of the communication. However, to enhance the performance of the beam operations, the UE may need to estimate its mobility state and report the measurement results to the BS based on certain measurement reporting mechanisms.

Thus, improvements on the measurement reporting mechanisms are needed in the art.

SUMMARY

The present disclosure is directed to methods and devices for measurement reporting in the beam operations.

According to an aspect of the present disclosure, a method for wireless communications is provided. The method includes counting, by a UE, a number of beam switching within a particular period of time, and transmitting, by the UE, a measurement report to a BS when the number of beam switching exceeds a threshold during the particular period of time.

According to another aspect of the present disclosure, a communication device is provided. The communication device includes one or more non-transitory computer-readable media having computer-executable instructions embodied thereon and at least one processor coupled to the one or more non-transitory computer-readable media. The at least one processor is configured to execute the computer-executable instructions to count a number of beam switching within a particular period of time, and transmit a measurement report to a BS when the number of beam switching exceeds a threshold during the particular period of time.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

FIG. 1 illustrates a report configuration, in accordance with an example implementation of the present disclosure.

FIG. 2 illustrates a measurement object configuration, in accordance with an example implementation of the present disclosure.

FIG. 3 illustrates a measurement configuration, in accordance with an example implementation of the present disclosure.

FIG. 12 illustrates a measurement configuration, in accordance with an example implementation of the present disclosure.

FIG. 13 illustrates a measurement object configuration, in accordance with an example implementation of the present disclosure.

FIG. 14 illustrates a report configuration, in accordance with an example implementation of the present disclosure.

FIGS. 15, 16 and 17 illustrate the measured results of a measurement object in different time slots, in accordance with example implementations of the present disclosure.

FIG. 18 is a flowchart for a method of beam management in response to triggering the even_X, in accordance with example implementations of the present disclosure.

FIG. 19 illustrates a TCI state configuration, in accordance with an example implementation of the present disclosure.

FIG. 20 illustrates a MAC CE for activating the TCI state(s), in accordance with an example implementation of the present disclosure.

FIG. 21 illustrates a CORESET configuration, in accordance with an example implementation of the present disclosure.

FIG. 22 illustrates a DCI for the PDSCH beam indication, in accordance with an example implementation of the present disclosure.

FIG. 24 illustrates a modified TCI state configuration, in accordance with an example implementation of the present disclosure.

DETAILED DESCRIPTION

Figure 4:
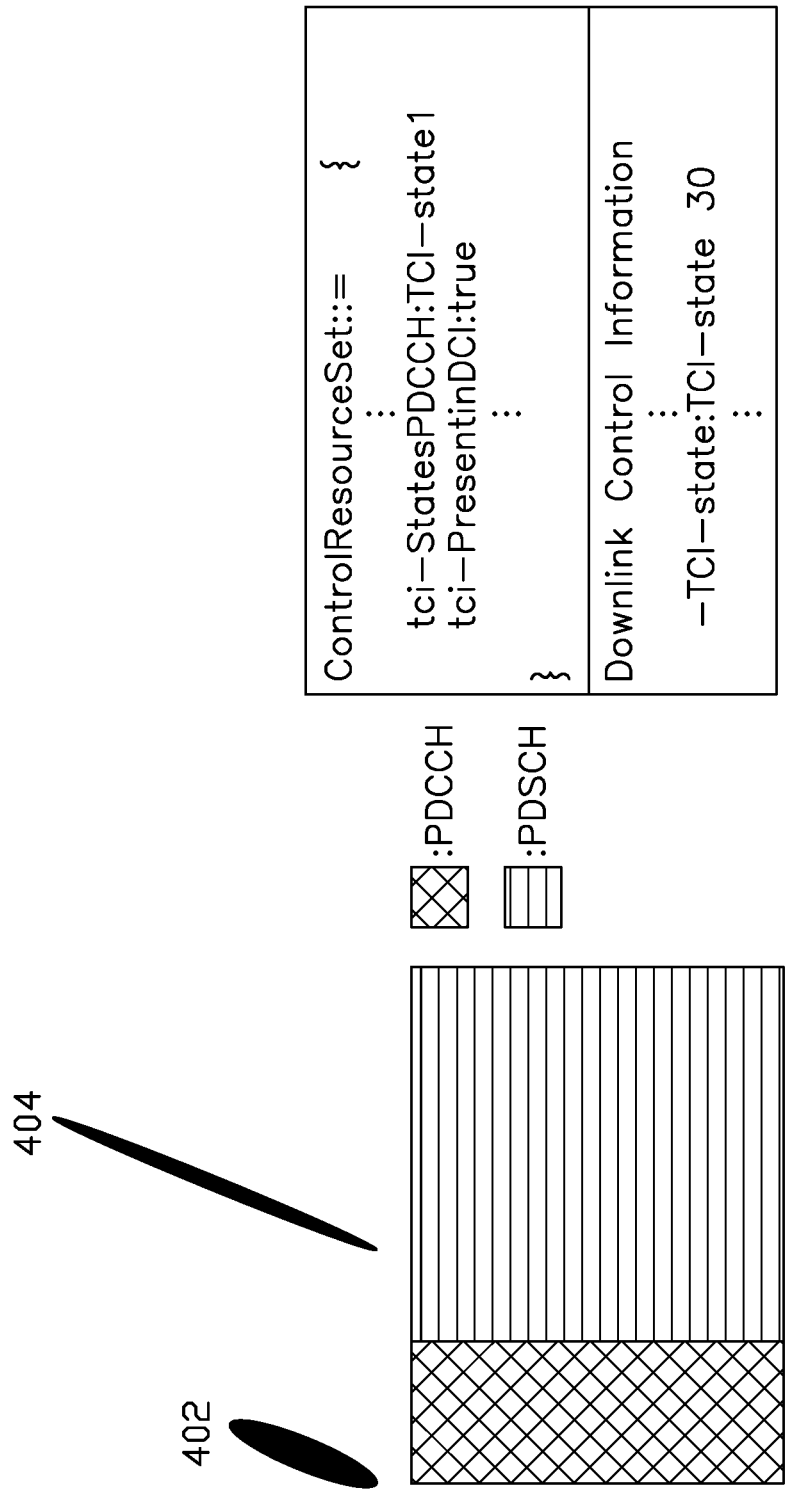
FIG. 4 illustrates a procedure of Downlink (DL) beam management, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one BS, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet), through a radio access network (RAN) established by the BS.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A BS may include, but is not limited to, a node B (NB) as in the Universal Mobile Telecommunication System (UMTS), an evolved node B (eNB) as in the LTE-A, a Radio Network Controller (RNC) as in the UMTS, a BS Controller (BSC) as in the Global System for Mobile communications (GSM)/GSM EDGE Radio Access Network (GERAN), an ng-eNB as in an E-UTRA BS in connection with the 5GC, a next generation node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as SpCell. PCell may refer to the SpCell of an MCG. PSCell may refer to the SpCell of an SCG. MCG means a group of serving cells associated with the Master Node (MN), comprising of the SpCell and optionally one or more secondary cells (SCells). SCG means a group of serving cells associated with the Secondary Node (SN), comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

As mentioned above, in an LTE wireless communication system, the UE may use a Mobility State Estimation (MSE) mechanism to estimate the UE's mobility state (e.g., by counting the number of cell re-selections during a given time period). However, the MSE mechanism in LTE doesn't take into account the cell sizes. Furthermore, the $3^{rd}$ Generation Partnership Project (3GPP) RAN2 working group has pointed out the inaccuracy of the MSE in the Heterogeneous Network (HetNet). To resolve such an inaccuracy in the UE-based MSE, the mobility history report has been used in the LTE wireless communication system. For example, whenever the serving cell changes, the UE may store the previous cell identifier and the time spent value in the cell, and report them to the BS (e.g., the eNB) upon entering the Radio Resource Control (RRC) CONNECTED state. With the help of the mobility history report, the BS is able to estimate the UE's speed and set several parameters to suit the estimated UE's speed for each UE operated in the RRC CONNECTED state.

The MSE mechanism may be enhanced and expanded in the NR wireless communication system. The estimation performed by the BS (e.g., the gNB) based on the mobility history may be more accurate because the BS may have more information to help estimate the UE's speed. For example, in the NR wireless communication system, the beam may be visible by the UE, and the UE may identify each individual beam based on the Channel State Information (CSI)-Reference Signal (RS) or the Synchronization Signal Block (SSB). Therefore, in the NR wireless communication system, the UE may be able to report a more detailed beam level mobility history to the network by recording the time spent in each beam or the variation of the serving beam. The network may then estimate the UE's speed more accurately from the beam level mobility history information.

The NR wireless communication system may use a Beam Level Mobility Report (BLMR) to improve the performance of the initial access in the IDLE state and the beam management in the CONNECTED state.

In some of the present implementations, a trigger event (e.g., called "even_X") for the BLMR is provided. For example, the UE may count a number of beam switching in a particular period of time, and transmit a measurement report (e.g., the BLMR) to the BS when the number of beam switching exceeds a threshold during the particular period of time.

FIG. 1 illustrates a report configuration 100, in accordance with an example implementation of the present disclosure. In some of the present implementations, the report configuration may be associated with at least one measurement configuration, where the report configuration may indicate at least one of the threshold (e.g., X-MaxCounter) and the particular period of time (e.g., TimeToTrigger) for triggering the BLMR. Furthermore, the report configuration may be associated with at least one measurement object including one or more RSs for the Radio Resource Management (RRM) (e.g., an SSB or a CSI-RS resource). The UE may receive the report configuration from the BS.

As shown in FIG. 1, the report configuration (e.g., ReportConfig) 100 may include at least a ReportConfigID and the configuration of event_X. The configuration of event_X may include at least one of the following Information Elements (IEs): X-Threshold, X-MaxCounter and Time-ToTrigger. The X-Threshold IE may be used as a threshold to avoid frequently triggering event_X. For example, in some of the present implementations, the counter for beam switching may be increased when the Reference Signal Received Power (RSRP) of RS(s) decreases more than X-Threshold (e.g., 10 dB). The UE may trigger event_X when the counter for beam switching exceeds X-MaxCounter (e.g., 7 times) during the period of time indicated by TimeToTrigger (e.g., 100 ms).

As mentioned above, the counter for beam switching may be increased according to the measured result of the RSs. The counter for beam switching and the timer for counting TimeToTrigger may be per Component Carrier (CC), per Bandwidth Part (BWP) or per UE in some implementations. Furthermore, in each predefined measured window (e.g., 10 time slots), the UE may measure all the RSs contained in the measurement object and average all the measured results of each RS during the measured window in some of the present implementations.

In some of the implementations, the counter for beam switching may be triggered (e.g., increased) when the order of the measured results of an RS subset changes between two consecutive measured windows. In some of such implementations, the RS subset may be the RS(s) with the maximum Reference Signal Received Power (RSRP). In some other implementations, the RS subset may be the top N RSs (e.g. N=3) with the better RSRP measured results, where N may be configurable. The rule(s) for choosing the subset of RSs may be predefined or may be configured by the BS through the RRC signaling.

FIG. 2 illustrates a measurement object configuration 200, in accordance with an example implementation of the present disclosure. As shown in FIG. 2, the UE may measure CSI-RS resource #1, CSI-RS resource #2 and CSI-RS resource #3 in MeasObject #1 (e.g., with MeasObjectID=1) based on the measurement object configuration (e.g., MeasObject) 200. In some of the present implementations, the RS subset may include the RS(s) with the maximum RSRP. In a case that the order of the measured RSRP result in slot # K from good to poor is CSI-RS resource #1, CSI-RS resource #3 and CSI-RS resource #2, and the order of the measured RSRP result in slot # K+10 (e.g., the next measured window) from good to poor is CSI-RS resource #3, CSI-RS resource #1 and CSI-RS resource #2, the counter for beam switching may increase by "1" because the RS with the maximum RSRP is CSI-RS resource #1 in slot # K while it changes to CSI-RS resource #3 in slot # K+10. In some other implementations, the counter for beam switching may increase in slot # K+1 when the RSRP of CSI-RS resource #1 in slot # K+1 decreases more than X-Threshold (e.g., 10 dB) than in slot # K. In some other implementations, if X-Threshold is "0 dB" or this IE is absent, the UE may consider only the beam switching for triggering the measurement report.

In some of the present implementations, each report configuration may be associated with a MeasObject (or any other RS configuration). The UE may transmit the measurement report based on the measured result of the associated RS configuration(s) and the trigger condition of trigger event (e.g., event_X).

FIG. 3 illustrates a measurement configuration 300, in accordance with an example implementation of the present disclosure. As shown in FIG. 3, the association between the RS configuration (e.g., MeasObject) and the report configuration (e.g., ReportConfig) may be configured to the UE in the measurement configuration (e.g., MeasConfig) 300 through the RRC signaling.

In some of the present implementations, when the report configuration contains event_X, the UE may implicitly consider all RSs contained in the RRC configured Transmission Configuration Indication (TCI) table as the RSs of the measurement object. In such a case, all TCI-RS-sets may be regarded as the RSs of measurement object.

As mentioned before, in some of the present implementations, the UE may trigger event_X and transmit the measurement report to the BS when the counter for beam switching exceeds a preconfigured threshold (e.g., X-MaxCounter) in a particular period of time (e.g., TimeToTrigger) based on the sliding window of every measured window. In some such implementations, if the value of the counter is below X-MaxCounter after TimeToTrigger, the measured result of the $1^{st}$ measured window may be aborted, and the UE may keep monitoring the RS(s) and obtain the measured result(s) for MeasObject in the next measured window.

In some of the present implementations, when the UE triggers measurement report based on event_X, the UE may be in a Not Feasible-to-perform the Beam-Based Operation Situation (NFBOS) (e.g., due to the high overhead and less effect).

Some of the present implementations may provide a new mechanism in which the UE may ignore the dynamic beam direction indication (e.g., TCI state #1) contained in the TCI field of the Downlink Control Information (DCI) transmitted from the BS. In this type of situation, in some of the present implementations, the UE may apply the default beam direction (e.g., TCI state #2) until the UE receives (e.g., from the BS) RRC signaling or a Medium Access Control (MAC) Control Element (CE) indicating a change in the beam indication setting. The new mechanism may be applied to the UE that may or may not be in the NFBOS. In some of the present implementations, RRC signaling may be used to reconfigure or modify a mapping of a set of RSs to a set of TCI states. In some other implementations, the MAC CE may be used to indicate or activate a new TCI state Identifier (ID).

In some of the present implementations, all measurement configurations associated with event_X may be independent. That is, in some implementations, the UE may keep monitoring a portion of the measurement configurations even though the UE has already transmitted the BLMR triggered by one of the measurement configurations. In some other implementations, once the UE transmits a BLMR triggered by any one of the measurement configurations, the UE may discard all the remaining measurement configurations associated with event_X. In such cases, all measurement configurations associated with event_X may not be independent, and the measurement report may be simplified as only containing one bit "YES(TRUE)/NO(FALSE)" to reflect whether the UE is under the NFBOS or not.

In some of the present implementations, the beam indication setting may turn off the dynamic indication field in the DCI. In some other implementations, the beam indication setting may modify the RS sets contained in the TCI-RS-setting.

In some of the present implementations, the default beam direction may be the direction of the beam used for the Control Resource Set (CORESET) containing the DCI for the UE. In some other implementations, the default beam direction may be the direction of the beam indicated by a fixed index from the TCI states (e.g., the RS set contained in the 1$^{st}$ state of the TCI states).

In some of the present implementations, the BS may configure the beam direction by setting the TCI-statePD-CCH IE in the CORESET configuration of RRC signaling. The BS may indicate that the DCI includes the dynamic beam indication by setting the TCI-PresentInDCI IE in the CORESET configuration.

FIG. 4 illustrates a procedure of DL beam management, in accordance with an example implementation of the present disclosure. As shown in FIG. 4, the UE may be configured by the RRC configuration in which the TCI-statePD-CCH IE is set as "TCI-state 1" and the TCI-PresentInDCI IE is set as "true." Hence, the UE may follow the TCI state indication (e.g., TCI-state 30) in the DCI for the Physical Downlink Shared Channel (PDSCH).

In some of the present implementations, the control channel and the data channel may apply different beams (e.g., the beam 402 and the beam 404) because the data channel sometimes may apply a refine beam (e.g., the beam 404) to achieve higher data rate. Therefore, the BS may use the TCI state in the DCI to indicate the refine beam (e.g., the beam 404 corresponding to TCI-state 30) for data transmission. However, if the UE is in the NFBOS, the UE may need to change the refine beam frequently, which may cause some DL data missing and performance degrading. Furthermore, the BS may not realize that the UE has missed the DL data until the BS receives the negative message(s) such as Non-Acknowledgement (NACK) message form the UE. The BS may need some time to adjust the dynamic beam direction based on the UE's aperiodic CSI report. Therefore, the BS and the UE may not know which beam to use for PDSCH in this period of time.

Figure 5:
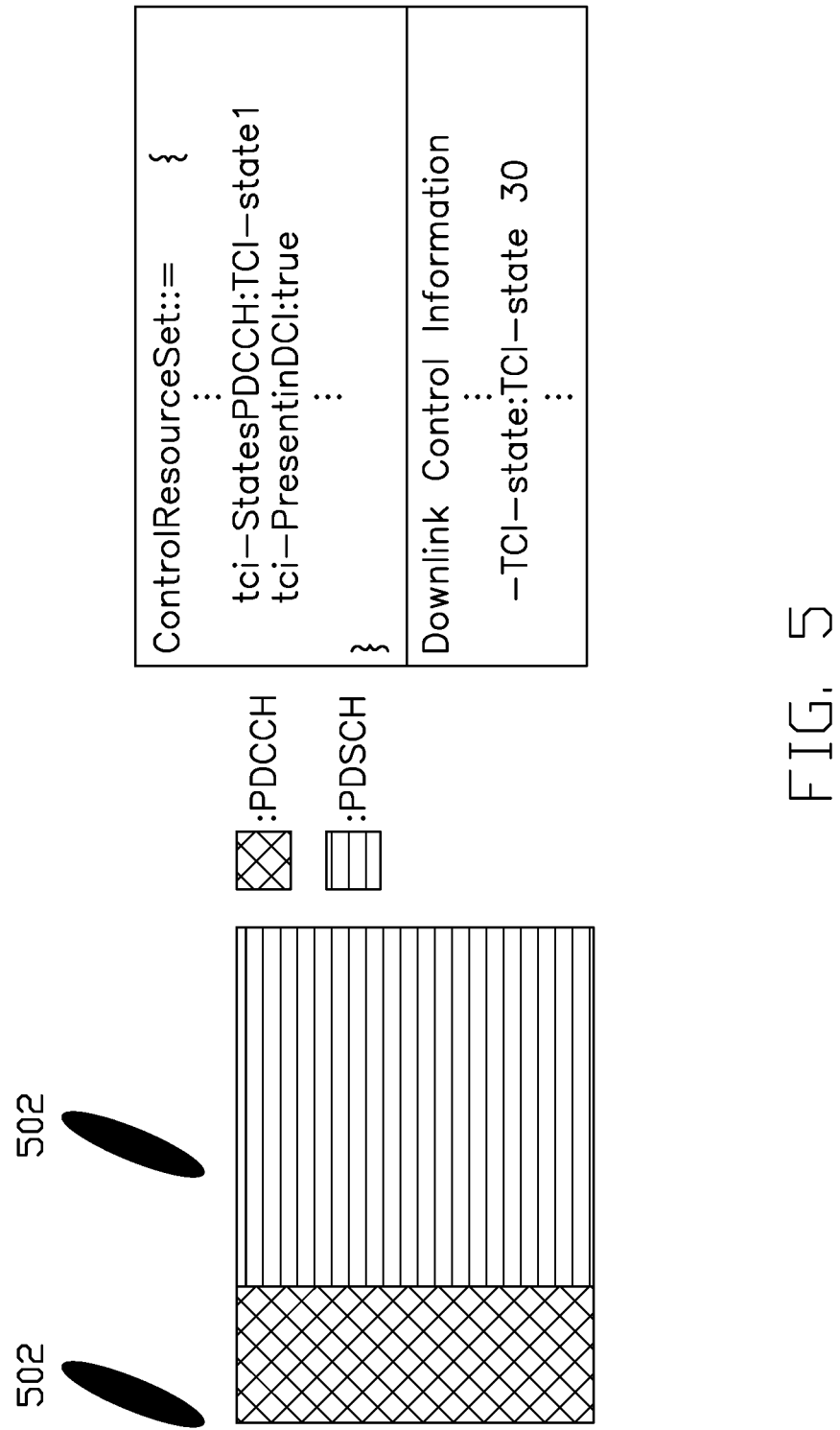
FIG. 5 illustrates a procedure of DL beam management, in accordance with an example implementation of the present disclosure.

FIG. 5 illustrates a procedure of DL beam management, in accordance with an example implementation of the present disclosure. In the present implementation, the UE operated in the NFBOS may ignore the dynamic beam indication contained in the DCI and follow the default beam (e.g., the beam 502). As shown in FIG. 5, after the UE triggers the measurement report based on event_X, the UE may ignore the TCI state indication (e.g., TCI-state 30) contained in the DCI, and follow the default beam direction (e.g., corresponding to TCI-state 1) indicated by TCI-statePDCCH before the UE makes sure that the BS has received the measurement report.

In some of the present implementations, after the UE receives an RRC reconfiguration message that turns the TCI-PresentInDCI into "false(off)" or modifies the TCI-state configuration, the UE may resume the normal behavior (e.g., the UE may follow the configuration of the BS to receive PDSCH). In some other implementations, the UE may resume the normal behavior upon receiving a specific MAC CE. The MAC CE may be used to, for example, activate different TCI-states. The active TCI-states may be the TCI-states indicated by the DCI.

In some of the present implementations, the UE may transmit an indicator to the BS to inform the BS that the UE has already left the NFBOS. For example, the UE may keep monitoring MeasObject(s) after the UE has transmitted the BLMR, if the report configuration for event_X includes a particular indicator (e.g., a LeaveToTrigger indication). In some implementations, if the measured result for the next TimeToTrigger period does not trigger event_X, the UE may transmit a measurement report (e.g., a BLMR) to inform the BS that the UE has left the NFBOS and the UE may turn to perform the normal behavior. It should be noted that the reporting behavior of the UE may be configured by the BS (e.g., the gNB). The reporting behavior may include event-triggered (e.g., triggered by event_X) reporting and/or periodic reporting (e.g. with specified periodicity). In some of the present implementations, the measurement configuration for the BLMR may share the same structure with the RRM measurement. For example, for the measurement identification (e.g., the measurement ID and/or the object ID), the UE may use the same ID pool for both BLMR and normal measurement reports. For example, in a case that the RRC configures 64 measurement configuration IDs or measurement object IDs or report configuration IDs in total, these 64 IDs may be shared by both the cell-level measurement report and the beam-level measurement report.

In some of the present implementations, the UE may perform a procedure of SSB detection during the initial access to establish communication links with the BS. However, the UE may suffer from the NFBOS because the beam-based initial access may be introduced/applied in the higher frequency band(s) for 5G NR.

Figure 6:
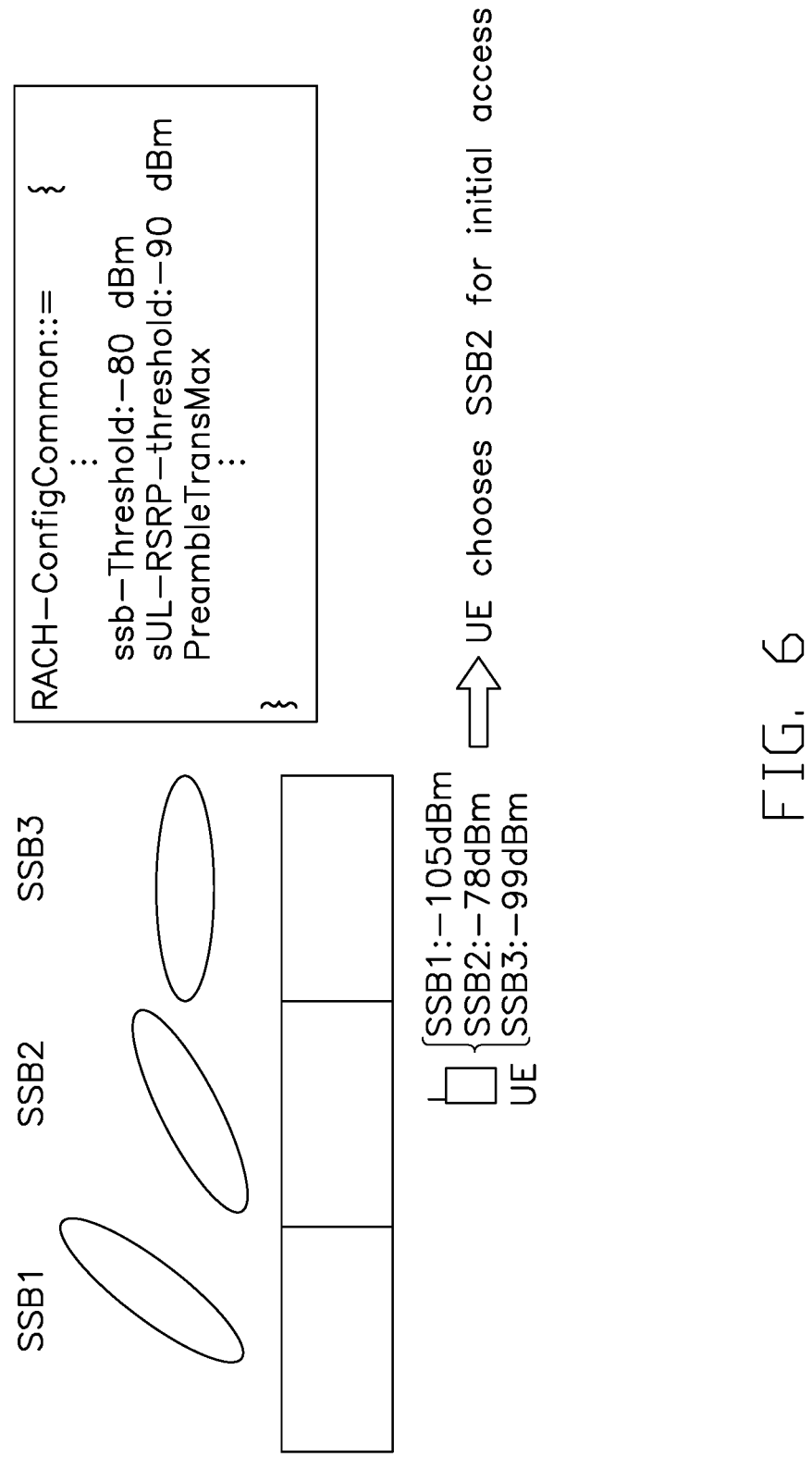
FIG. 6 illustrates a procedure of Synchronization Signal Block (SSB) detection, in accordance with an example implementation of the present disclosure.

FIG. 6 illustrates a procedure of SSB detection, in accordance with an example implementation of the present disclosure. As shown in FIG. 6, during the beam-based initial access, the UE may need to measure all the SSBs (e.g., SSB1, SSB2 and SSB3) transmitted by the BS and find a qualified SSB based on a preconfigured threshold (e.g., ssb-Threshold/rsrp-ThresholdSS) contained in the Remaining Minimum System Information (RMSI). For example, the UE may transmit the Message 1 (MSG1) when the RSRP of an SSB is better than (e.g., above) ssb-Threshold. However, for a UE operated in the NFBOS, the qualified SSBs may become unqualified when the UE transmits the MSG1 because there may be a time gap between the measurement and the actual transmission. Therefore, in some of the present implementations, the UE (in the NFBOS) may forgo applying the beam operation during the initial access procedure. For example, in the NR wireless communication system, the UE may perform the initial access on the supplementary Uplink (sUL) carrier or the UL carrier based on the measured result of the SSBs. Because the sUL carrier may be operated in a lower frequency band than the UL carrier, the sUL carrier may not need to apply the beam-based initial access due to the low Path Loss (PL) wave property. However, if all of the UEs perform the initial access on the sUL carrier, the collision probability for the MSG1 transmission may highly increase. Therefore, in some of the present implementations, the sUL-threshold may be determined to restrict the number of UEs to access via the sUL. For example, in some of the present implementations, only those UEs with the cell level signal quality lower than the sUL-threshold may be allowed to perform the initial access in the sUL carrier.

In some of the present implementations, when the UE is in the NFBOS (e.g., when the measured result of the beam-based SSB varies quickly), it may be better for the UE to use the sUL carrier to transmit the MSG1. In some such implementations, two counters may be used to determine the sUL-threshold: one is the preamble transmission counter (e.g., PREAMBLE_TRANSMISSION_COUNTER) and the other one is the preamble power ramping counter (e.g., PREAMBLE_POWER_RAMPING_COUNTER). The UE, in some of the present implementation, may determine the sUL threshold for the initial access transmission based on a difference between the preamble transmission counter value and the preamble power ramping counter value. In some of the present implementations, the UE may increase the sUL threshold when the difference between the preamble transmission counter value and the preamble power ramping counter value exceeds a predetermined threshold. This way, the UE is more likely to transmit the MSG1 on the sUL carrier for the initial access.

In some of the present implementations, each time the UE transmits the MSG1, the preamble transmission counter value may increase by one. The UE may determine that the MSG1 transmission has failed when the preamble transmission counter value exceeds a predefined (configured) value (e.g., PreambleTransMax). On the other hand, in some implementations, the preamble power ramping counter value may increase by one only when the UE uses the same beam to transmit the MSG1 as the pervious one transmission. Therefore, the difference between these two counters (e.g., the preamble transmission counter and the preamble power ramping counter) may be considered as the beam switch frequency in some of the present implementations. For example, when PREAMBLE_TRANSMISSION_COUNTER is "10" and the PREAMBLE_POWER_RAMPING_COUNTER is "0", the UE may consider that the beams for transmitting the preambles may switch very frequently because the UE changes the UL TX beam for every MSG1 transmission. On the other hand, when the PREAMBLE_TRANSMISSION_COUNTER is "10" while the PREAMBLE_POWER_RAMPING_COUNTER is "9", the UE may consider that there is only one beam switch during the ten times MSG1 transmissions, which means that the UE's mobility state may be relatively stable.

As mentioned above, because the UE in the NFBOS may be better to use the sUL carrier for the MSG1 transmission, in some of the present implementations, the sUL threshold may be increased according to the difference between the preamble transmission counter value (e.g., PREAMBLE_TRANSMISSION_COUNTER) and the preamble power ramping counter value (e.g., PREAMBLE_POWER_RAMPING_COUNTER). For example, when the PREAMBLE_TRANSMISSION_COUNTER is "10" and the PREAMBLE_POWER_RAMPING_COUNTER is "1," the sUL threshold may be increased by a predefined value. For example, when the predefined value is "2," the sUL threshold may be increased by a multiple of 3 dB. When the measured result is lower than the modified sUL threshold, the UE may abort the ongoing RACH procedure and trigger a new RACH procedure on the sUL carrier in some implementations. In some of the present implementations, the multiplication number may be form the PREAMBLE_TRANSMISSION_COUNTER.

In some other implementations, the UE may increase the sUL threshold only when the difference between the preamble transmission counter value and the preamble power ramping counter value exceeds a predetermined factor in order to avoid too many UEs transmitting the MSG1 on the sUL carrier.

Figure 7:
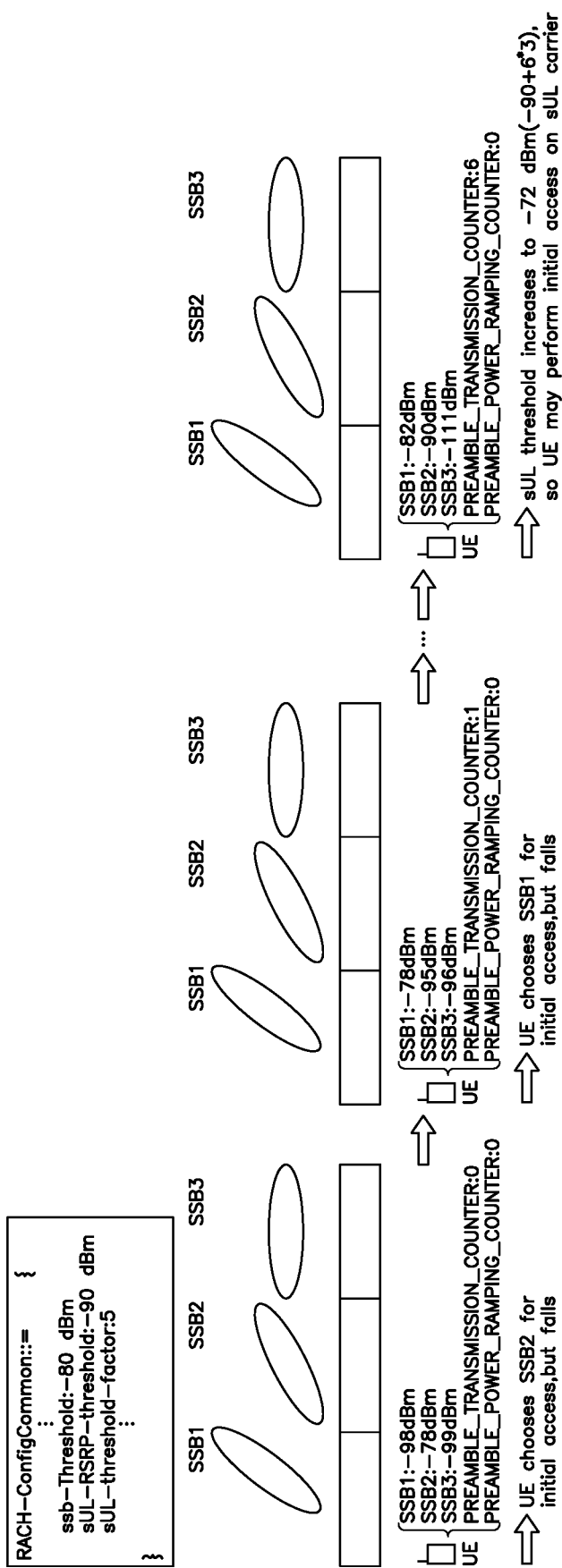
FIG. 7 illustrates an initial access procedure, in accordance with an example implementation of the present disclosure.

FIG. 7 illustrates an initial access procedure for a UE in the NFBOS, in accordance with an example implementation of the present disclosure. In the present implementation, the UE may increase the sUL threshold only when the difference between the preamble transmission counter value and the preamble power ramping counter value exceeds a predetermined factor (e.g., sUL-threshold-factor, which is set as "5" in the example of FIG. 7). On the other hand, if the difference between the preamble transmission counter value and the preamble power ramping counter value is less than the predetermined factor, the UE may apply the original sUL threshold.

As shown in FIG. 7, at first, the measured results (e.g., RSRP) of SSB1, SSB2 and SSB3 are −98 dBm, −78 dBm and −99 dBm, respectively. Thus, in this stage, the UE may choose SSB2, which has the best beam quality, as the qualified SSB for the initial access. If the initial access fails, the UE may keep monitoring the SSBs and find a new qualified SSB. As shown in FIG. 7, the UE may then determine that the qualified SSB is SSB1 because SSB1 has the best measured result (e.g., −78 dBm). As mentioned above, once the SSB for the initial access is changed, the value of PREAMBLE_TRANSMISSION_COUNTER may increase by "1". However, the value of PREAMBLE_POWER_RAMPING_COUNTER may still remain the same (e.g., remain as "0") because the UE does not use the same beam for the initial access as the previous one MSG1 transmission.

Thereafter, as shown in FIG. 7, when the difference between the value of PREAMBLE_TRANSMISSION_COUNTER and the value of PREAMBLE_POWER_RAMPING_COUNTER increases to "6," which exceeds the predetermined factor (e.g., sUL-threshold-factor), the UE may increase the sUL threshold (e.g., increased to −72 dBm) to perform the initial access on the sUL carrier.

In some of the present implementations, the UE may transmit the indices of all of the selected SSBs during the initial access procedure upon successfully establishing an RRC connection with the BS (e.g., via the MSG5).

In some scenarios, the UE may encounter the degradation of DL beam quality. The UE may not receive DL signaling successfully because of the poor signal quality, which is also referred to as beam failure. When the UE detects a beam failure, the UE may trigger a Beam Failure Recovery (BFR) procedure and send the Beam Failure Recovery reQuest (BFRQ) to the BS if the UE can find a new candidate beam by monitoring the DL RSs (e.g., CSI-RSs and/or SSBs). In some of the present implementations, a counter may be used to limit the maximum number for the UE to transmit the BFRQ. For example, the counter may be increased by "1" each time the UE transmits a BFRQ.

In some other scenarios, the UE may find a qualified beam to transmit the BFRQ, but fails to receive the response from the BS for a successful BFR because the UE may be in a high-speed mobility state. Specifically, if the UE moves fast, the qualified DL beam for the UE might be different between the time the UE monitors the candidate beam and the time the UE monitors the response from the BS after the UE transmits the BFRQ. Therefore, in some of the present implementations, the UE may inform the BS of the information on how many times the UE has transmitted the BFRQ. The BS may estimate the mobility state of the UE based on the information received from the UE.

In some other implementations, the UE may transmit a report to the BS after the BFR procedure. The report may indicate a total number of BFRQ transmitted by the UE during the BFR procedure. It should be noted that the report may have various data formats. For example, the report may be implemented as a measurement report, a specific IE, an indicator or any other preconfigured parameter.

In some of the present implementations, the UE may send a report (e.g., BLMR) which includes the number of BFRQ that the UE has transmitted for the BFR. In some of the present implementations, if the BLMR is triggered during the BFR procedure, the UE may terminate the BFR procedure and transmit the BLMR to the BS. In one implementation, the information that UE reports to the BS may include the information of spatial domain filter that the UE has applied for the BFRQ transmission (e.g., the index of the DL RSs (e.g., the index of CSI-RSs and/or SSBs)). The information of the DL RSs may help the BS to decide the appropriate spatial domain filter for transmission and/or reception for the UE.

In some of the present implementations, after the UE switches to the RRC INACTIVE state, the UE may not report the BLMR. In some such implementations, the UE may follow the same measurement configuration as the BS configured during the RRC CONNECTED state. In some other implementations, the BS may configure a new measurement configuration to the UE for the RRC inactive state through RRC suspend signaling. Once the UE resumes to the RRC CONNECTED state, the UE may transmit a resume message to the BS to indicate whether the UE is under the NFBOS or not. In response to receiving the resume message, the BS may know how to schedule the UE.

Figure 8:
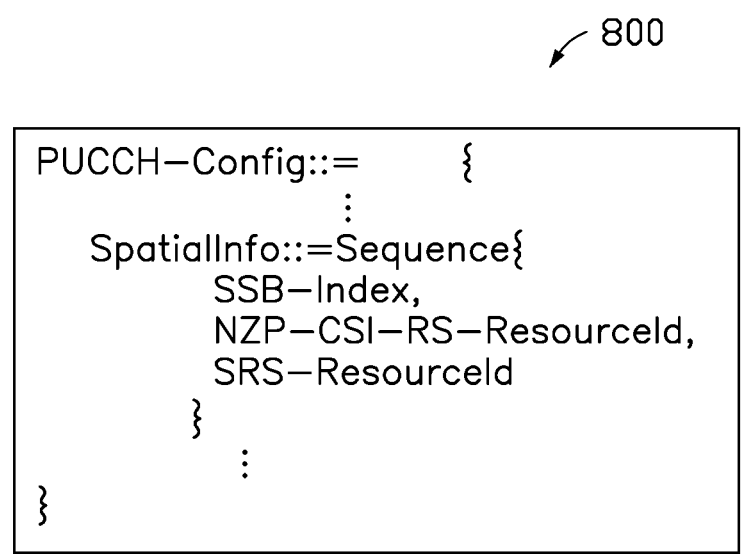
FIG. 8 illustrates a Physical Uplink Control Channel (PUCCH) configuration, in accordance with an example implementation of the present disclosure.

FIG. 8 illustrates a PUCCH configuration 800, in accordance with an example implementation of the present disclosure. As shown in FIG. 8, the PUCCH configuration 800 (e.g., transmitted by the BS) may include one or more RS indices to indicate the UL beam information. As shown in FIG. 8, the SpatialInfo IE contained in the PUCCH configuration may include at least one of the following items: the SSB index (e.g., SSB-index), the SRS resource index (e.g., SRS-ResourceId), and the CSI-RS resource index (e.g., NZP-CSI-RS-ResourceId). In some of the present implementations, if there are more than one RS indices contained in the PUCCH configuration, the BS may indicate one of the RS indices via the MAC CE.

Figure 9:
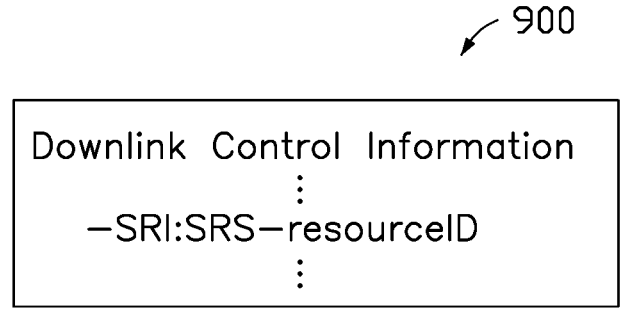
FIG. 9 illustrates an SRS Resource Indicator (SRI) bit field contained in the DCI, in accordance with an example of the present disclosure.

FIG. 9 illustrates an SRS Resource Indicator (SRI) bit field contained in the DCI 900, in accordance with an example of the present disclosure. As shown in FIG. 9, different from the beam indication for the PUCCH, the UL beam for the PUSCH may be indicated by the SRI bit field in the DCI 900 in some of the present implementations. Hence, the UL beam indication of the PUSCH may be more dynamic than the UL beam indication of the PUCCH in some of the present implementations. With this feature, in some of the present implementations, the UE may let the UL beam for the PUCCH transmission be the same as the UL beam indicated by the SRI when certain condition(s) is met. For example, after the UE receives (from the BS) the DCI that contains the spatial information for the PUSCH transmission, the UE may perform the PUCCH transmission using the spatial information contained in the DCI, when a time offset between a configured PUSCH and a configured PUCCH is less than a transition gap configured by the BS. In some such implementations, the spatial filter (e.g., phase shift filter) used for the PUSCH transmission may be the same as that for the PUCCH transmission.

In some of the present implementations, the UE may obtain the UL beam information based on the corresponding beam capability after receiving the DL signal. Moreover, there might be necessary to have a transition gap when the UE needs to use different spatial filters to generate different UL beams. For example, the PUCCH may be configured as starting from the next OFDM symbol of the PUSCH, whereas the UE may not be able to apply a coarse UL beam for the PUCCH due to the limitation of the transition gap. In such a situation, the UE may apply the same spatial filter as the PUSCH transmission to generate the UL beam for the PUCCH transmission. It should be noted that transition gap may depend on the UE capability in some implementations. Hence, in some of the present implementations, the UE may transmit the UE capability information to the BS during the capability negotiation procedure. The UE capability information may include a minimum required time (or a minimum required transition gap, e.g., X OFDM symbols) for the UE to switch beams between the PUSCH transmission and the PUCCH transmission. Afterwards, the BS may further indicate the exact transition gap to the UE based on the UE capability information.

In some other implementations, where the time offset between the configured PUCCH and the configured PUSCH is less than the transition gap indicated by the BS, the UE may not transmit the PUCCH and the PUSCH separately. In some of such implementations, the UE may apply the Uplink Control Information (UCI) piggyback mechanism (e.g., transmitting the UCI on the PUSCH) even though the PUCCH and the PUSCH do not start at the same OFDM symbol. For example, when the transition gap indicated by the BS is two symbols and there is only one symbol between the end of the PUSCH and the beginning of the PUCCH, the UE may apply the UCI piggyback mechanism to transmit the UCI on the PUSCH and discard the PUCCH transmission. It should be noted that the resource scheduled for the PUSCH may be extended to the resource scheduled for the PUCCH in some implementations.

Figure 10:
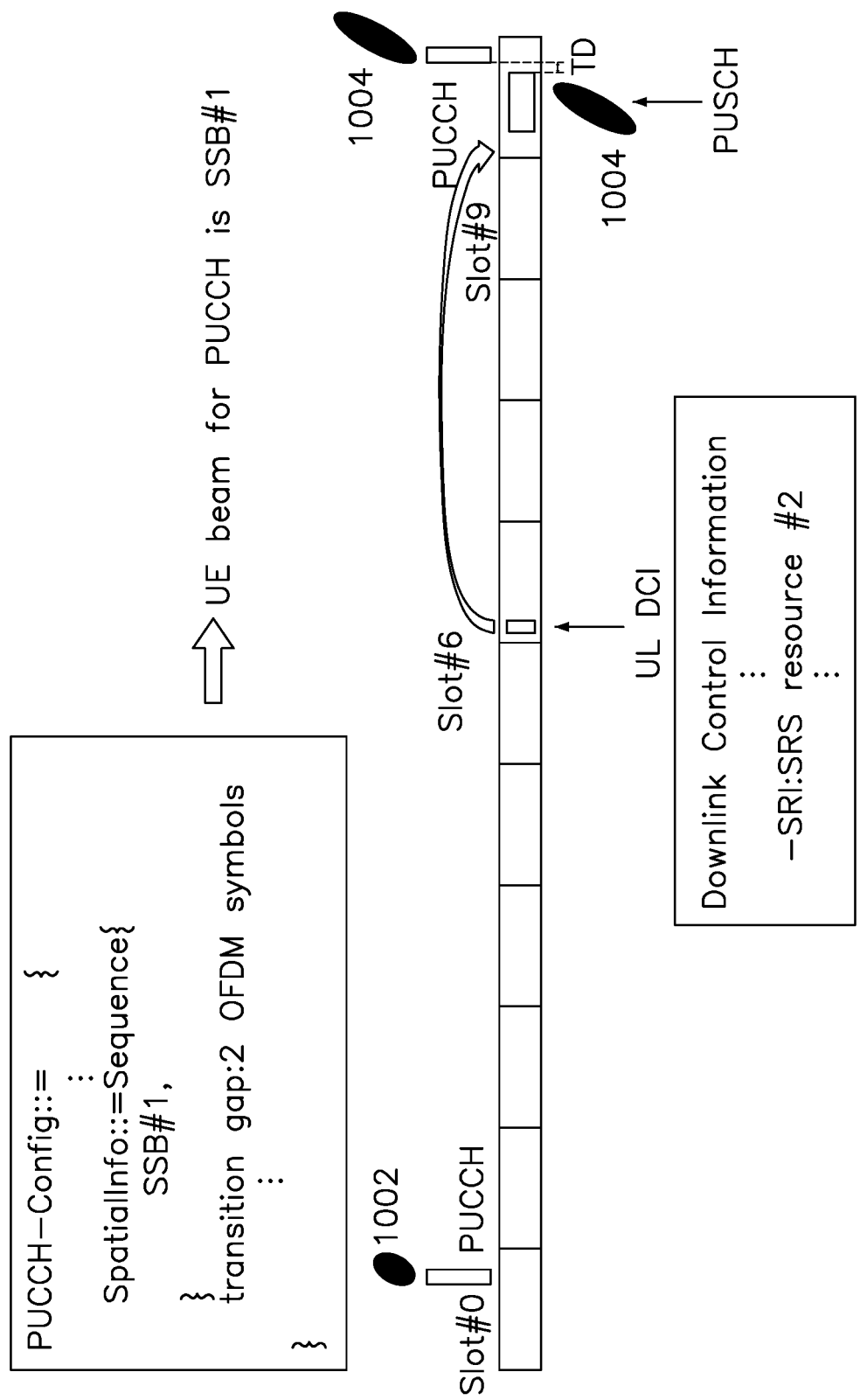
FIG. 10 is a schematic diagram illustrating the UE reusing the same spatial filter as the PUSCH transmission to generate the UL beam for the PUCCH transmission.

FIG. 10 is a schematic diagram illustrating the UE reusing the same spatial filter as the PUSCH transmission to generate the UL beam for the PUCCH transmission. As shown in FIG. 10, in slot #0, the UE may receive a PUCCH configuration that contains a PUCCH beam indication (e.g., SSB #1) and a transition gap. Based on the PUCCH configuration, the UE may use the coarse UL beam 1002 to transmit the PUCCH on the $9^{th}$ OFDM symbol every 10 slots based on the CSI report configuration (e.g., slot #0, slot #10, . . . , and so on). According to the PUCCH beam indication, the UE may generate the UL beam 1002 using the same spatial filter as the DL RX beam for receiving SSB #1.

In slot #6, the UE may successfully receive the DCI from the BS. The DCI may indicate to the UE to transmit the PUSCH in slot #10, and indicate that the time duration for the PUSCH is from the $4^{th}$ OFDM symbol to the $8^{th}$ OFDM symbol. The DCI may further include the SRI bit field. Based on the SRI bit field, the UE may use the fine UL beam 1004 (e.g., corresponding to SRS resource #2) to perform the PUSCH transmission.

In slot #10, because the time offset TD between the end of the PUSCH and the beginning of the PUCCH is only one symbol, which is less than the transition gap configured by the BS (e.g., two symbols), the UE may apply the same spatial filter as SRS resource #2, which is indicated by the SRI bit field contained in the DCI, to perform the PUCCH transmission.

In some other implementations, the UE may monitor and count the switch of the cell-defining SSB. The switch of the cell-defining SSB may be achieved by the sync reconfiguration of RRC signaling. In a case that the sync reconfiguration contains a DL frequency band different from the current active DL BWP, the UE may consider this case as a switch of the cell-defining SSB and thus increase the counter. When the counter exceeds the threshold configured by the BS, the UE may transmit an indicator to the BS. In response to receiving the indicator, the BS may trigger a handover to let the UE camp on a new target BS with a lower frequency band. In some of the present implementations, the counter may be maintained only at the BS side and may be transparent to the UE. In such a case, the BS may trigger the handover based on the counter without the UE's indication. In some other implementations, the UE may monitor and count the switch of the cell-defining SSB within a predefined interval. It should be noted that the changes of the cell-defining SSB may further include an event that happens at different serving cells. In some implementations, the UE may update the status (e.g., the number of changes) to the new target BS (e.g., the gNB) during the handover procedure. In some other implementations, the UE may update the status (e.g., the number of changes) to the new target BS (e.g., the gNB) when establishing an RRC connection with the camped BS in order to facilitate the beam management and/or the BWP management.

In some other implementations, the UE may monitor the switch of the cell-defining SSB and report the history information when the UE camps on a new cell (e.g., though the handover procedure or the cell reselection procedure). The history information may include a list of Absolute Radio-Frequency Channel Number (ARFCN) or Global Synchronization Channel Number (GSCN) to indicate which frequency locations the UE has stayed in a period of time. For example, a new IE VisitedCellDefiningSSBInfoList may be reported to the BS when the UE (re)establishes the RRC connection with the BS. In some of the present implementations, the VisitedCellDefiningSSBInfoList IE may include the mobility history information of a maximum of 16 most recently visited cell defining SSBs (e.g., represented by its ARFCN), and/or the time spent value. The most recently visited cell-defining SSB may be first stored in the list. The time spent value may indicate a time duration of stay in the cell-defining SSB approximated to the closest second.

In some other implementations, if the UE supports the storage of the history information related to the switch of the cell-defining SSB, the UE may include the VisitedCellDefiningSSBInfoAvail IE in the RRC message (e.g., the RRCConnectionSetupComplete message) to inform the Network (NW). If required, the NW may send the information request message to the UE to ask the UE to report the history information related to the switch of the cell-defining SSB (e.g., the new IE VisitedCellDefiningSSBInfoList). In some other implementations, the source BS may inform the target BS that the UE may support the storage of the history information related to the switch of the cell-defining SSB. In some other implementations, the UE may inform the target BS that the UE can support the storage of the history information related to the switch of the cell-defining SSB (e.g., including the VisitedCellDefiningSSBInfoAvail IE in the handover command complete message).

Figure 11:
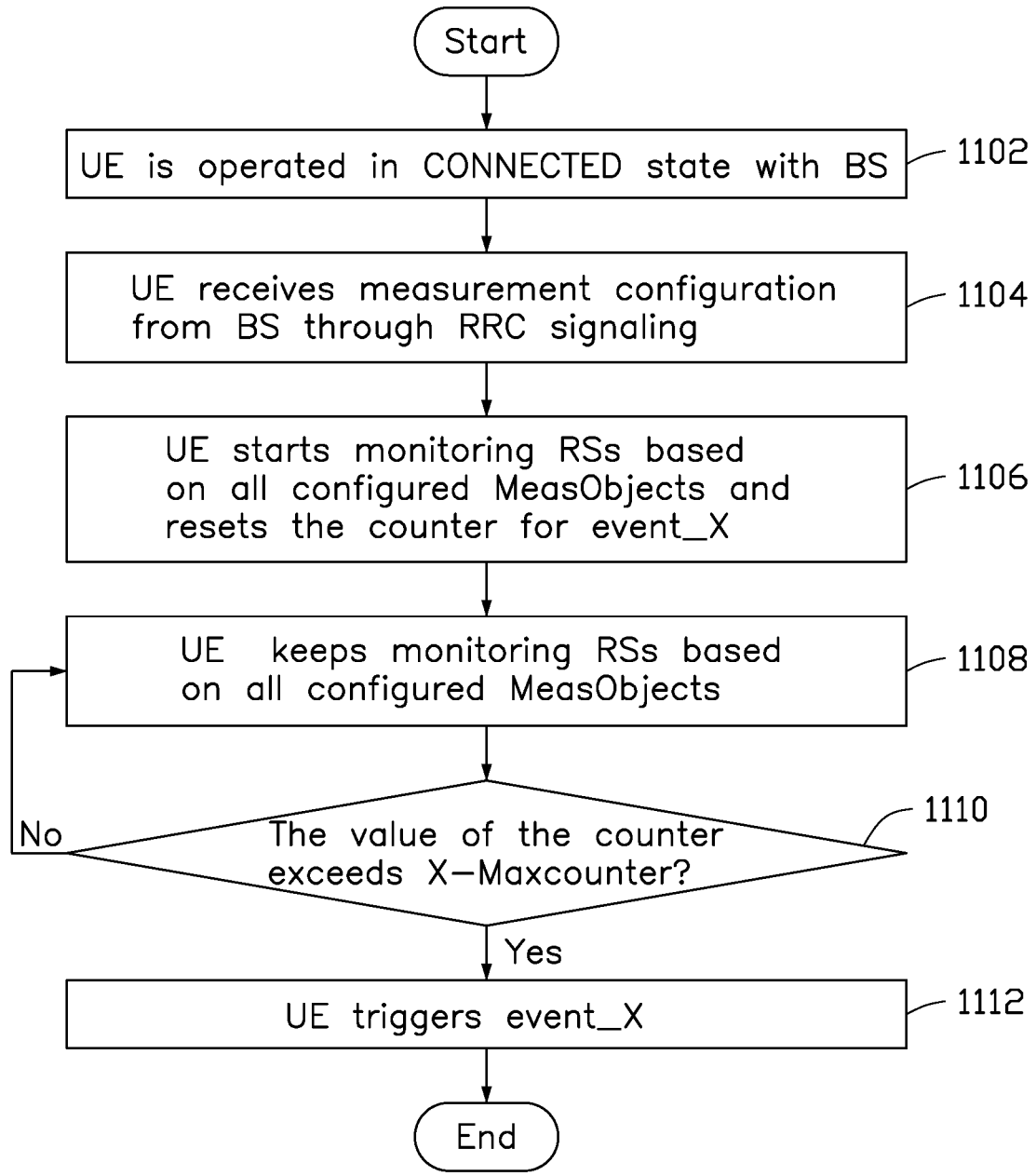
FIG. 11 is a flowchart for a method of measurement reporting, in accordance with an example implementation of the present disclosure.

FIG. 11 is a flowchart for a method of measurement reporting, in accordance with an example implementation of the present disclosure. As shown in FIG. 11, the flowchart may include actions 1102, 1104, 1106, 1108, 1110 and 1112.

In action 1102, the UE may be operated in the CONNECTED state with the BS (e.g., using a subcarrier spacing of 15 KHz, which means that the length of each slot is 1 ms).

In action 1104, the UE may receive a measurement configuration from the BS through RRC signaling. Examples of the measurement configuration and the related configurations are shown below with reference to FIGS. 12, 13 and 14.

FIG. 12 illustrates a measurement configuration 1200, in accordance with an example implementation of the present disclosure. As shown in FIG. 12, the measurement configuration (e.g., MeasConfig) 1200 may include several IEs such as a MeasID, a MeasObjectID and a ReportConfigID.

FIG. 13 illustrates a measurement object configuration 1300, in accordance with an example implementation of the present disclosure. As shown in FIG. 13, the measurement object configuration (e.g., MeasObject) 1300 may include at least a MeasObjectID and a ReferenceSignalConfig parameter. Based on the MeasObjectID, the UE may monitor MeasObject #2 (e.g., with MeasObjectID=2) which includes CSI-RS resource #1, CSI-RS resource #2, and CSI-RS resource #3.

FIG. 14 illustrates a report configuration 1400, in accordance with an example implementation of the present disclosure. As shown in FIG. 14, the report configuration (e.g., ReportConfig) 1400 may include at least a ReportConfigID and the configuration of event_X to trigger the BLMR.

In some of the present implementations, the BS may transmit the measurement configuration (e.g., MeasConfig shown in FIG. 12) to the UE to associate the measurement object configuration (e.g., MeasObject shown in FIG. 13) with the report configuration (e.g., ReportConfig shown in FIG. 14).

Turning to back FIG. 11, in action 1106, the UE may start monitoring the RSs based on all of the configured MeasObjects, and reset the counter for event_X (e.g., setting the value of this counter as "0").

In action 1108, the UE may keep monitoring the RSs based on all of the configured MeasObjects. In some of the present implementations, the UE may determine the RS subset according to the measured results of the MeasObject. The value of the counter may increase by "1" whenever the RS set changes. Examples of the measured results are shown in FIGS. 15, 16 and 17.

Figures 17, 18:
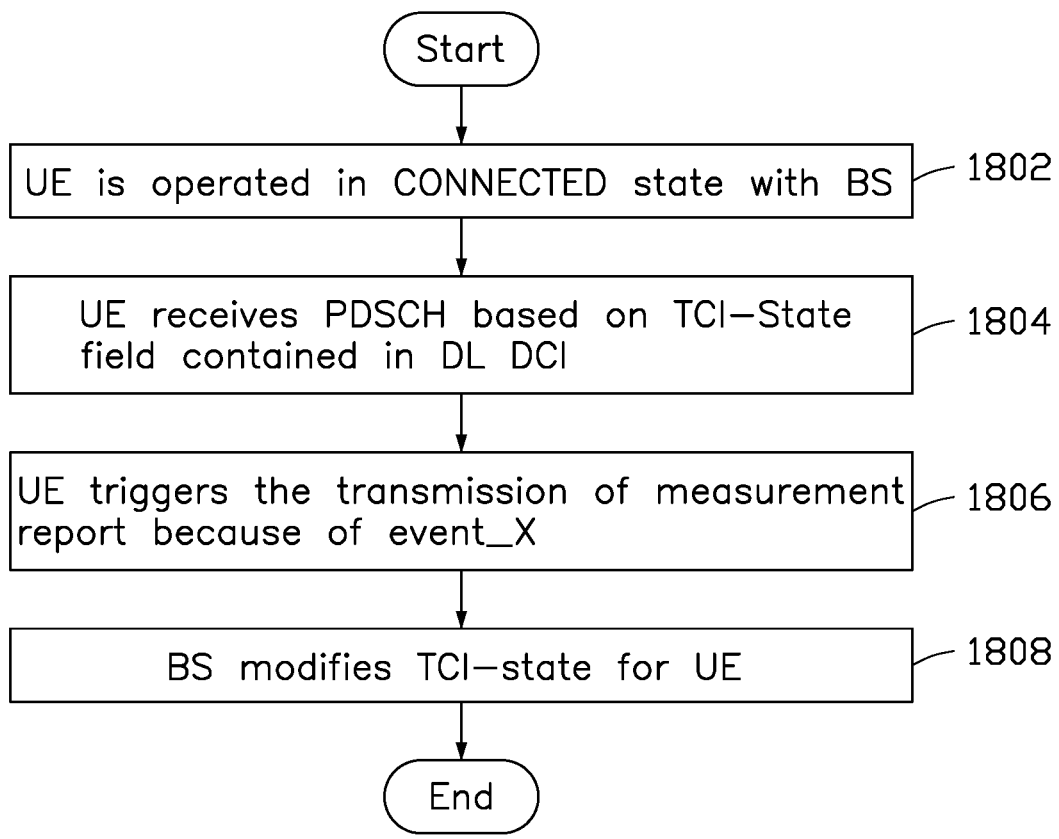

FIGS. 15, 16 and 17 illustrate the measured results 1500, 1600 and 1700 of a MeasObject in time slot # K, time slot # K+1, and time slot # K+2, respectively. As shown in FIG. 15, in time slot # K, CSI-RS resource #1 is measured as −70 dBm, CSI-RS resource #2 is measured as −90 dBm, and CSI-RS resource #3 is measured as −91 dBm. Therefore, the order of the RSs (from good to poor) is CSI-RS resource #1, CSI-RS resource #2 and CSI-RS resource #3. Then, in time slot # K+1 as shown in FIG. 16, the order of the RSs (from good to poor) is CSI-RS resource #2 (−59 dBm), CSI-RS resource #1 (−89 dBm), and CSI-RS resource #3(−90 dBm).

Assuming that the rule for determining the RS subset is to choose the top two RSs with better RSRP, the value of the counter for event_X may increase by "1" because the RS subset has changed from {CSI-RS resource #1, CSI-RS resource #2} into {CSI-RS resource #2, CSI-RS resource #1}.

In time slot # K+2, the measured result 1700 is listed as shown in FIG. 17. The order of the RSs (from good to poor) is CSI-RS resource #2 (−63 dBm), CSI-RS resource #1 (−91 dBm) and CSI-RS resource #3 (−92 dBm). Therefore, the counter may remain the same because the RS subset is still {CSI-RS resource #2, CSI-RS resource #1}.

It should be noted that although the measured results shown in FIGS. 15, 16 and 17 are obtained per time slot, in some other implementations, the measured results may be obtained per measured window. In each measured window (e.g., having 10 time slots), the UE may measure all of the RSs contained in the measurement object and average all the measured results of the RSs during the measured window.

Turning back to FIG. 11, in action 1110, the UE may determine whether the value of the counter exceeds a threshold (e.g., X-Maxcounter).

In action 1112, when the value of the counter exceeds the threshold, the UE may trigger event_X (e.g., transmitting a measurement report to the BS). Otherwise, action 1108 is performed when the value of the counter does not exceed the threshold. In some of the present implementations, the measurement report may include a measurement ID (e.g., MeasID) that contains event_X and the associated MeasObject.

FIG. 18 is a flowchart for a method of beam management in response to triggering the event_X, in accordance with an example implementation of the present disclosure. As shown in FIG. 18, the flowchart may include actions 1802, 1804, 1806, and 1808.

In action 1802, the UE may be operated in the CONNECTED state with the BS. The BS may dynamically adjust the beam for the PDSCH by the TCI field of the DCI. For example, the BS may adjust the beam for the PDSCH by setting tci-PresentinDCI field in the CORESET configuration of the RRC signaling as "true (on)." Examples of the TCI state configuration, the MAC CE for activating the TCI states, and the CORESET configuration are shown, respectively, in FIGS. 19, 20, and 21.

In action 1804, the UE may receive the PDSCH based on the TCI-state field contained in the DCI. An example of the DCI is shown in FIG. 22.

In action 1806, the UE may trigger the transmission of the measurement report because of event_X. The triggering mechanism of event_X may be the value of the counter for event_X exceeding a preconfigured threshold (e.g., X-Max-Counter). In some of the present implementations, after transmitting the measurement report, the UE may not follow the TCI state (e.g., "TCI-state 8" shown in FIG. 22) contained in the DCI, but may apply the TCI state (e.g., "TCI-state 4" shown in FIG. 21) contained in the CORESET configuration for the PDCCH.

In action 1808, the BS may modify the TCI state for the UE because the UE may be in the NFBOS. An example of the modified TCI state configuration is shown in FIG. 24.

FIG. 19 illustrates a TCI state configuration (e.g., TCIStateConfiguration) 1900, in accordance with an example implementation of the present disclosure. As shown in FIG. 19, there may be 16 TCI states configured by TCIStateConfiguration 1900. These TCI-states may be SSB #1, SSB #2, SSB #3, SSB #4, SSB #8, CSI-RS resource #1, CSI-RS resource #2, . . . , and CSI-RS resource #8.

FIG. 20 illustrates a MAC CE 2000 for activating the TCI state(s), in accordance with an example implementation of the present disclosure. As shown in FIG. 20, the BS may activate eight TCI states (e.g., SSB #1, SSB #2, SSB #3, SSB #4, CSI-RS resource #1, CSI-RS resource #2, CSI-RS resource #3 and CSI-RS resource #4) amongst the 16 TCI states using the MAC CE 2000 illustrated in FIG. 20.

FIG. 21 illustrates a CORESET configuration 2100, in accordance with an example implementation of the present disclosure. As shown in FIG. 21, the BS may configure a beam (e.g., corresponding to "TCI-state 4") for the PDCCH to the UE through the CORESET configuration 2100.

FIG. 22 illustrates a DCI 2200 for the PDSCH beam indication, in accordance with an example implementation of the present disclosure. As shown in FIG. 22, the PDSCH beam indication contained in the DCI 2200 is "TCI-state 8."

Figure 23:
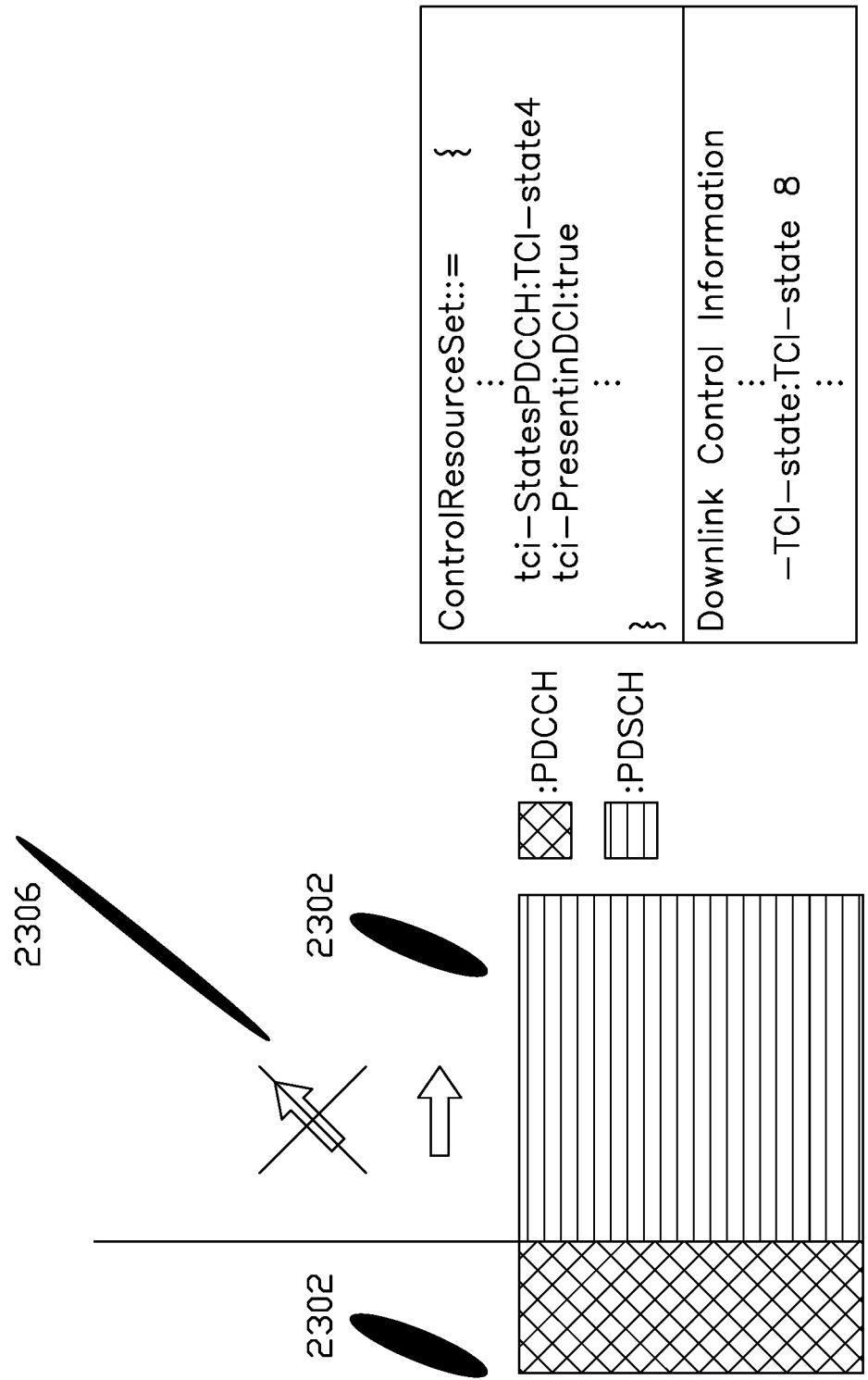
FIG. 23 illustrates a schematic diagram of beam operations after a UE triggering event_X, in accordance with an example implementation of the present disclosure.

FIG. 23 illustrates a schematic diagram of the beam operation after the UE triggers event_X. As shown in FIG. 23, the UE may not follow the indication (e.g., "TCI-state 8") of the DCI, but apply the original setting (e.g., "TCI-state 4") contained in the CORESET configuration for PDCCH. As shown in FIG. 23, for the PDSCH, the UE may apply the same (coarse) beam 2302 (e.g., corresponding to "TCI-state 4") as used for the PDCCH, instead of applying the (fine) beam 2306 corresponding to "TCI-state 8" indicated by the DCI.

FIG. 24 illustrates a modified TCI state configuration 2400, in accordance with an example implementation of the present disclosure. As shown in FIG. 24, the modified TCI states are SSB #1, SSB #2, SSB #3, SSB #4, . . . , and SSB #16. This is because these SSBs may transmit on the coarse beam (e.g., the beam 2302 shown in FIG. 23). Hence, the impact of the NFBOS may be alleviated.

Figure 25:
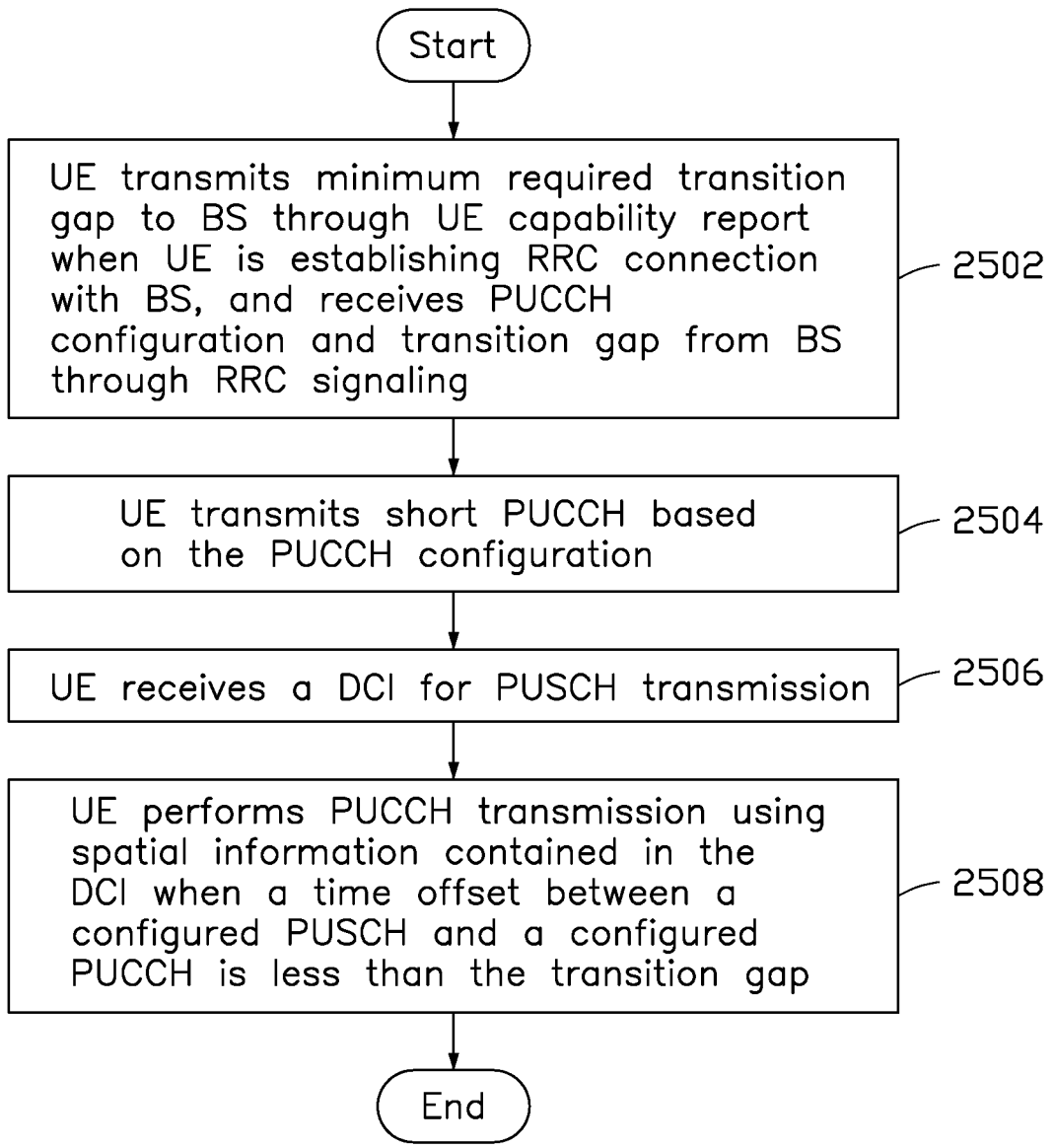
FIG. 25 is a flowchart for a method of beam management in response to a time offset between the PUCCH and the PUSCH, in accordance with an example implementation of the present disclosure.

FIG. 25 is a flowchart for a method of beam management in response to a time offset between the PUCCH and the PUSCH, in accordance with an example implementation of the present disclosure. As shown in FIG. 25, the flowchart may include actions 2502, 2504, 2506 and 2508.

In action 2502, the UE may transmit the minimum required transition gap to the BS through the UE capability report, when the UE is establishing the RRC connection with the BS. In some of the present implementations, the BS may then transmit the PUCCH configuration (e.g., the PUCCH configuration shown in FIG. 10) and the actual transition gap to the UE through the RRC signaling.

In action 2504, the UE may transmit the short PUCCH to the BS based on the PUCCH configuration.

In action 2506, the UE may receive a DCI for the PUSCH transmission from the BS.

In action 2508, the UE may perform the PUCCH transmission using the spatial information contained in the DCI, when the time offset between the configured PUSCH and the configured PUCCH is less than the transition gap configured by the BS. As shown in FIG. 10, in slot #10, because the time offset TD between the end of the PUSCH and the beginning of the PUCCH is only one symbol, which is less than the transition gap configured by the BS (e.g., two symbols), the UE may apply the same spatial filter of SRS resource #2, which is indicated by the SRI bit field contained in the DCI, to perform the PUCCH transmission.

Figure 26:
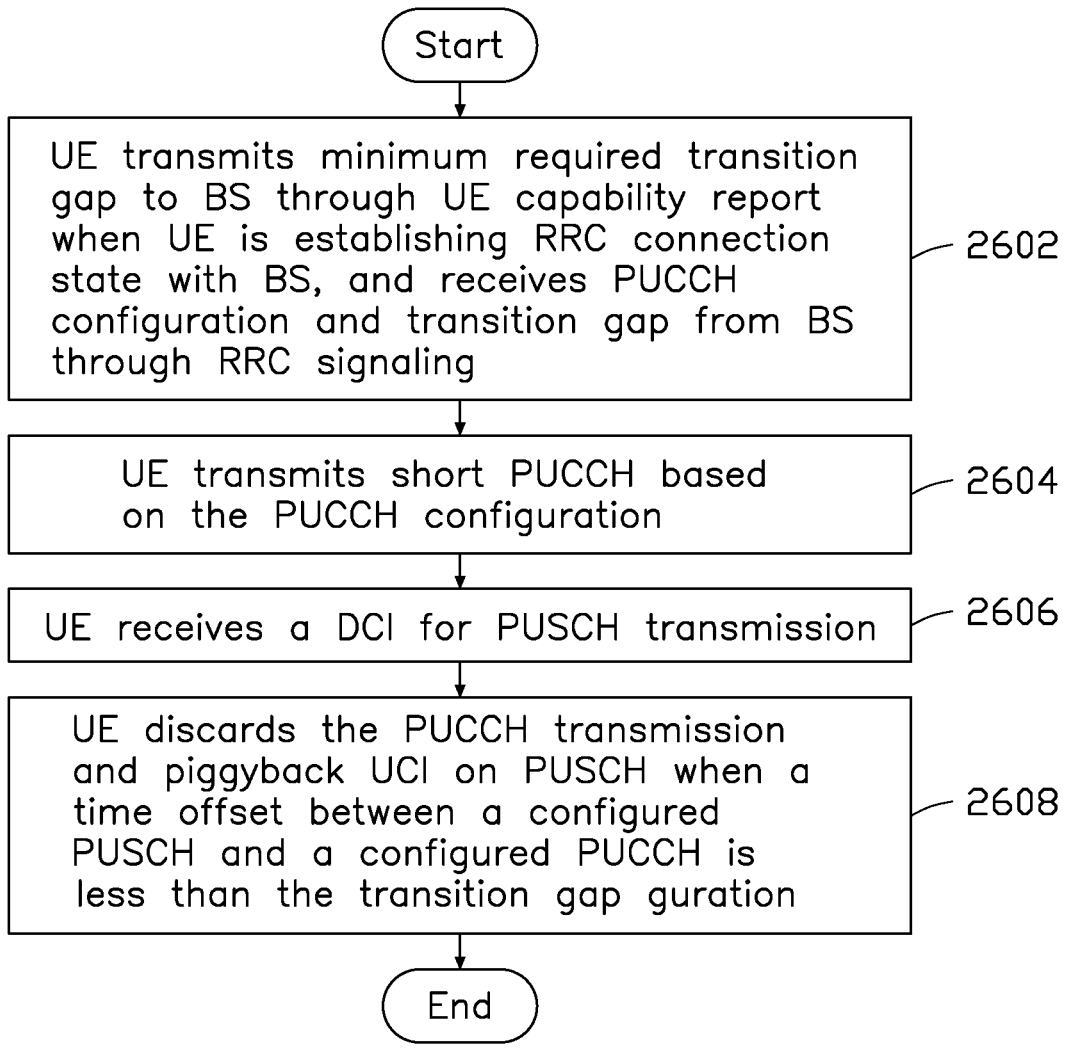
FIG. 26 is a flowchart for a method of beam management in response to a time offset between the PUCCH and the PUSCH, in accordance with an example implementation of the present disclosure.

FIG. 26 is a flowchart for a method of beam management in response to a time offset between the PUCCH and the PUSCH, in accordance with an example implementation of the present disclosure. As shown in FIG. 26, the flowchart may include actions 2602, 2604, 2606, and 2608.

In action 2602, the UE may transmit the minimum required transition gap to the BS through the UE capability report when the UE is establishing the RRC connection state with the BS. In some of the present implementations, the BS may transmit the PUCCH configuration and the actual transition gap through RRC signaling.

In action 2604, the UE may transmit the short PUCCH to the base station based on the PUCCH configuration.

In action 2606, the UE may receive a DCI for the PUSCH transmission from the BS.

In action 2608, the UE may discard the PUCCH transmission and piggyback the UCI on the PUSCH when a time offset between a configured PUSCH and a configured PUCCH is less than the transition gap. For example, when the time offset between the end of the PUSCH and the beginning of the PUCCH is one symbol, which is less than the transition gap configured by the BS (e.g., two symbols), the UE may discard the PUCCH transmission and piggyback the UCI on the PUSCH in some of the present implementations. In some such implementations, the UE may follow the parameter for the UCI multiplexing to generate the UCI payload on the PUSCH and transmit also by the UL beam for the PUSCH.

Figure 27:
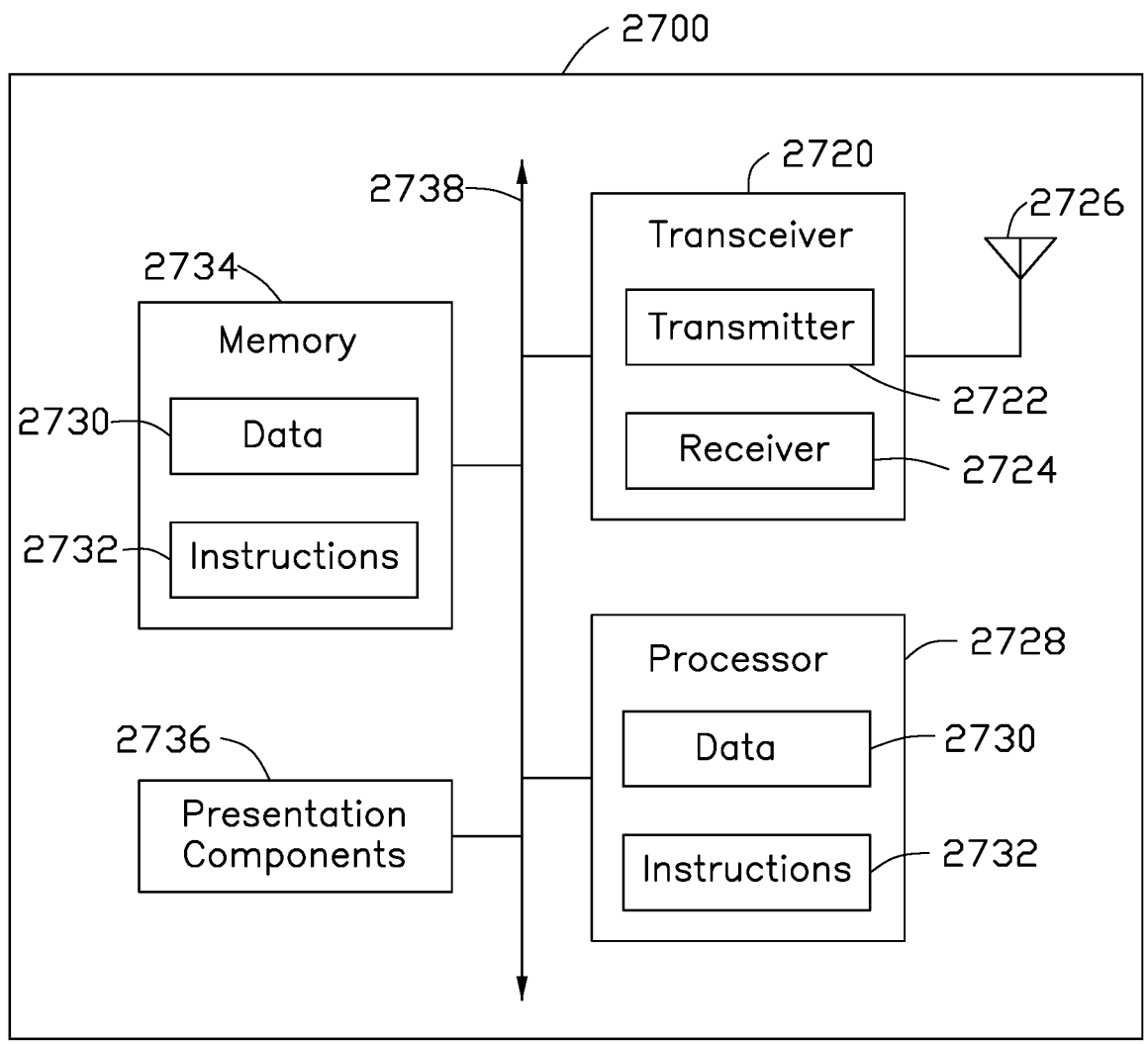
FIG. 27 illustrates a block diagram of a node for wireless communication, in accordance with various aspects of the present application.

FIG. 27 illustrates a block diagram of a node for wireless communication, in accordance with various aspects of the present application. As shown in FIG. 27, a node 2700 may include a transceiver 2720, a processor 2728, a memory 2734, one or more presentation components 2736, and at least one antenna 2726. The node 2700 may also include an RF spectrum band module, a BS communications module, a network communications module, and a system communications management module, input/output (I/O) ports, I/O components, and power supply (not explicitly shown in FIG. 27). Each of these components may be in communication with each other, directly or indirectly, over one or more buses 2738. In one implementation, the node 2700 may be a UE, a BS, or any communication device that performs various functions described herein, for example, with reference to FIGS. 1 through 26.

The transceiver 2720 having a transmitter 2722 (e.g., transmitting/transmission circuitry) and a receiver 2724 (e.g., receiving/reception circuitry) may be configured to transmit and/or receive time and/or frequency resource partitioning information. In some implementations, the transceiver 2720 may be configured to transmit in different types of subframes and slots including, but not limited to, usable, non-usable and flexibly usable subframes and slot formats. The transceiver 2720 may be configured to receive data and control channels.

The node 2700 may include a variety of computer-readable media. Computer-readable media can be any available media that can be accessed by the node 2700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 2734 may include computer-storage media in the form of volatile and/or non-volatile memory. The memory 2734 may be removable, non-removable, or a combination thereof. Exemplary memory includes solid-state memory, hard drives, optical-disc drives, and etc. As illustrated in FIG. 27, The memory 2734 may store computer-readable, computer-executable instructions 2732 (e.g., software codes) that are configured to, when executed, cause the processor 2728 to perform various functions described herein, for example, with reference to FIGS. 1 through 26. Alternatively, the instructions 2732 may not be directly executable by the processor 2728 but be configured to cause the node 2700 (e.g., when compiled and executed) to perform various functions described herein.

The processor 2728 (e.g., having processing circuitry) may include an intelligent hardware device, e.g., a central processing unit (CPU), a microcontroller, an ASIC, and etc. The processor 2728 may include memory. The processor 2728 may process the data 2730 and the instructions 2732 received from the memory 2734, and information through the transceiver 2720, the base band communications module, and/or the network communications module. The processor 2728 may also process information to be sent to the transceiver 2720 for transmission through the antenna 2726, to the network communications module for transmission to a core network.

One or more presentation components 2736 presents data indications to a person or other device. Exemplary presentation components 2736 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE), the method comprising:
   measuring a plurality of Reference Signals (RSs) configured to the UE;
   determining measured results of the plurality of RSs;
   ranking the plurality of RSs by the measured results;
   determining N RSs of the plurality of RSs as top N ranked RSs according to a ranking of each of the plurality of RSs, N being a positive integer;
   counting a number of beam switching occurrences within a particular period of time, wherein the number of beam switching occurrences increases when the ranking of at least one of the N RSs changes; and
   transmitting a measurement report to a base station when the number of beam switching occurrences exceeds a threshold during the particular period of time.

2. The method according to claim 1, further comprising:
   receiving, by the UE, a report configuration associated with at least one measurement configuration from the base station, wherein the report configuration indicates at least one of:
   the threshold, and
   the particular period of time.

3. The method according to claim 1, further comprising:
   receiving, by the UE, Downlink Control Information (DCI) comprising a first Transmission Configuration Indication (TCI) state from the base station; and
   applying, by the UE, a second TCI state instead of the first TCI state indicated in the DCI after receiving the DCI.

4. The method according to claim 3, wherein the second TCI state is applied by the UE until the UE receives Radio Resource Control (RRC) signaling or a Medium Access Control (MAC) Control Element (CE) from the base station indicating modification to TCI state.

5. The method according to claim 4, wherein the RRC signaling is to reconfigure or modify a mapping of a set of reference signals to a set of TCI states, and the MAC CE is to indicate or activate a new TCI state Identifier (ID).

6. The method according to claim 3, wherein the second TCI state is a default TCI state contained in a Control Resource Set (CORESET) configuration.

7. The method according to claim 1, further comprising:
determining, by the UE, a supplementary Uplink (sUL) threshold for an initial access transmission based on a difference between a preamble transmission counter value and a preamble power ramping counter value.

8. The method according to claim 7, further comprising:
increasing, by the UE, the sUL threshold when the difference between the preamble transmission counter value and the preamble power ramping counter value exceeds a predetermined threshold.

9. The method according to claim 1, further comprising:
receiving, by the UE, DCI containing spatial information for a Physical Uplink Shared Channel (PUSCH) transmission from the base station; and
performing, by the UE, a Physical Uplink Control Channel (PUCCH) transmission using the spatial information contained in the DCI, when a time offset between a configured Physical Uplink Shared Channel (PUSCH) and a configured PUCCH is less than a transition gap configured by the base station.

10. The method according to claim 1, further comprising:
transmitting, by the UE, Uplink Control Information (UCI) on a PUSCH when a time offset between a configured PUSCH and a configured PUCCH is less than a transition gap configured by the base station.

11. The method according to claim 1, further comprising:
transmitting, by the UE, UE capability information to the base station, wherein the UE capability information comprises a minimum required time for the UE to switch beams between a PUSCH transmission and a PUCCH transmission.

12. The method according to claim 1, further comprising:
transmitting, by the UE, a report to the base station after a beam failure recovery procedure, wherein the report indicates a total number of Beam Failure Recovery Request (BFRQ) transmitted by the UE during the beam failure recovery procedure.

13. A communication device comprising:
one or more non-transitory computer-readable media having computer-executable instructions embodied thereon; and
at least one processor coupled to the one or more non-transitory computer-readable media, and configured to execute the computer-executable instructions to:
measure a plurality of Reference Signals (RSs) configured to the UE;
determine measured results of the plurality of RSs;
rank the plurality of RSs by the measured results;
determine N RSs of the plurality of RSs as top N ranked RSs according to a ranking of each of the plurality of RSs, N being a positive integer;
count a number of beam switching occurrences within a particular period of time, wherein the number of beam switching occurrences increases when the ranking of at least one of the N RSs changes; and
transmit a measurement report to a base station when the number of beam switching occurrences exceeds a threshold during the particular period of time.

14. The communication device according to claim 13, wherein the at least one processor is further configured to execute the computer-executable instructions to:
receive a report configuration associated with at least one measurement configuration from the base station, wherein the report configuration indicates at least one of:
the threshold, and
the particular period of time.

15. The communication device according to claim 13, wherein the at least one processor is further configured to execute the computer-executable instructions to:
receive Downlink Control Information (DCI) comprising a first Transmission Configuration Indication (TCI) state from the base station; and
apply a second TCI state instead of the first TCI state indicated in the DCI after receiving the DCI.

16. The communication device according to claim 15, wherein the second TCI state is applied by the UE until the UE receives Radio Resource Control (RRC) signaling or a Medium Access Control (MAC) Control Element (CE) from the base station indicating modification to TCI state.

17. The communication device according to claim 16, wherein the RRC signaling is to reconfigure or modify a mapping of a set of reference signals to a set of TCI states, and the MAC CE is to indicate or activate a new TCI state Identifier (ID).

18. The communication device according to claim 15, wherein the second TCI state is a default TCI state contained in a Control Resource Set (CORESET) configuration.

19. The communication device according to claim 13, wherein the at least one processor is further configured to execute the computer-executable instructions to:
determine a supplementary Uplink (sUL) threshold for an initial access transmission based on a difference between a preamble transmission counter value and a preamble power ramping counter value.

20. The communication device according to claim 19, wherein the at least one processor is further configured to execute the computer-executable instructions to:
increase the sUL threshold when the difference between the preamble transmission counter value and the preamble power ramping counter value exceeds a predetermined threshold.

21. The communication device according to claim 13, wherein the at least one processor is further configured to execute the computer-executable instructions to:
receive DCI containing spatial information for a Physical Uplink Shared Channel (PUSCH) transmission from the base station; and
perform a Physical Uplink Control Channel (PUCCH) transmission using the spatial information contained in the DCI, when a time offset between a configured Physical Uplink Shared Channel (PUSCH) and a configured PUCCH is less than a transition gap configured by the base station.

22. The communication device according to claim 13, wherein the at least one processor is further configured to execute the computer-executable instructions to:
transmit Uplink Control Information (UCI) on a PUSCH when a time offset between a configured PUSCH and a configured PUCCH is less than a transition gap configured by the base station.

23. The communication device according to claim 13, wherein the at least one processor is further configured to execute the computer-executable instructions to:
transmit UE capability information to the base station, wherein the UE capability information comprises a minimum required time for the UE to switch beams between a PUSCH transmission and a PUCCH transmission.

24. The communication device according to claim 13, wherein the at least one processor is further configured to execute the computer-executable instructions to:
transmit a report to the base station after a beam failure recovery procedure, wherein the report indicates a total number of Beam Failure Recovery Request (BFRQ) transmitted by the UE during the beam failure recovery procedure.

\* \* \* \* \*